(12) United States Patent
Zhang et al.

(10) Patent No.: US 10,569,477 B2
(45) Date of Patent: Feb. 25, 2020

(54) JOINING OF THERMOPLASTIC TO METAL WITH ENHANCED INTERFACIAL CHEMICAL BONDING

(71) Applicant: GM GLOBAL TECHNOLOGY OPERATIONS LLC, Detroit, MI (US)

(72) Inventors: Jing Zhang, Shanghai (CN); David S. Yang, Shanghai (CN); Shawn Deng, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 110 days.

(21) Appl. No.: 15/546,547

(22) PCT Filed: Jan. 26, 2015

(86) PCT No.: PCT/US2015/012890
§ 371 (c)(1),
(2) Date: Jul. 26, 2017

(87) PCT Pub. No.: WO2016/122440
PCT Pub. Date: Aug. 4, 2016

(65) Prior Publication Data
US 2018/0022038 A1    Jan. 25, 2018

(51) Int. Cl.
*B29C 65/00* (2006.01)
*B29C 65/16* (2006.01)
(Continued)

(52) U.S. Cl.
CPC ........ *B29C 66/026* (2013.01); *B29C 65/1658* (2013.01); *B29C 65/44* (2013.01);
(Continued)

(58) Field of Classification Search
CPC ... B29C 66/026; B29C 66/1122; B29C 66/43; B29C 66/71; B29C 66/72143;
(Continued)

(56) References Cited

U.S. PATENT DOCUMENTS 5,234,516 A * 8/1993 Okamura ............... B32B 15/08
156/82
2008/0271843 A1   11/2008 Yukinobu
(Continued)

FOREIGN PATENT DOCUMENTS

WO     2012019115 A1    9/2012

OTHER PUBLICATIONS

International Search Report and Written Opinion for application No. PCT/US2015/012890 dated Apr. 21, 2015; 8 pages.

*Primary Examiner* — Daniel McNally
(74) *Attorney, Agent, or Firm* — Reising Ethington P.C.

(57) ABSTRACT

A method of attaching a thermoplastic-based workpiece and a metal workpiece involves the use of a metal reaction coating. The metal reaction coating is applied over a base metal substrate of the metal workpiece such that the metal reaction coating faces and contacts the thermoplastic-based workpiece when the two workpieces are assembled in overlapping fashion. To attach the workpieces at their faying interface, an energy source such as, for example, a laser beam or an electric arc, is directed against the metal workpiece to create a zone of concentrated heat that at least warms up the metal reaction coating and melts a portion of the thermoplastic-based workpiece. Such heated activity at the faying interface promotes interfacial chemical bonding between the thermoplastic-based workpiece and the metal workpiece that contributes to an enhanced attachment between the workpieces.

19 Claims, 4 Drawing Sheets

(51) Int. Cl.
*B29C 65/44* (2006.01)
*B32B 15/088* (2006.01)
*B32B 15/18* (2006.01)

(52) U.S. Cl.
CPC .......... *B29C 66/1122* (2013.01); *B29C 66/43* (2013.01); *B29C 66/71* (2013.01); *B29C 66/72143* (2013.01); *B29C 66/7392* (2013.01); *B29C 66/742* (2013.01); *B29C 66/74283* (2013.01); *B29C 66/836* (2013.01); *B32B 15/088* (2013.01); *B32B 15/18* (2013.01); *B32B 2255/06* (2013.01); *B32B 2255/205* (2013.01); *B32B 2262/106* (2013.01)

(58) Field of Classification Search
CPC .............. B29C 66/7392; B29C 66/742; B29C 66/74283; B29C 66/836; B29C 65/1658; B29C 65/44; B32B 15/008; B32B 15/18
See application file for complete search history.

(56) References Cited

U.S. PATENT DOCUMENTS

| | | | |
|---|---|---|---|
| 2013/0119025 A1* | 5/2013 | Lee .................... | B23K 26/0884 219/121.64 |
| 2013/0136944 A1* | 5/2013 | Mizrahi ................ | B32B 15/02 428/608 |
| 2013/0192751 A1* | 8/2013 | Arai .................... | B29C 65/1635 156/272.6 |

* cited by examiner

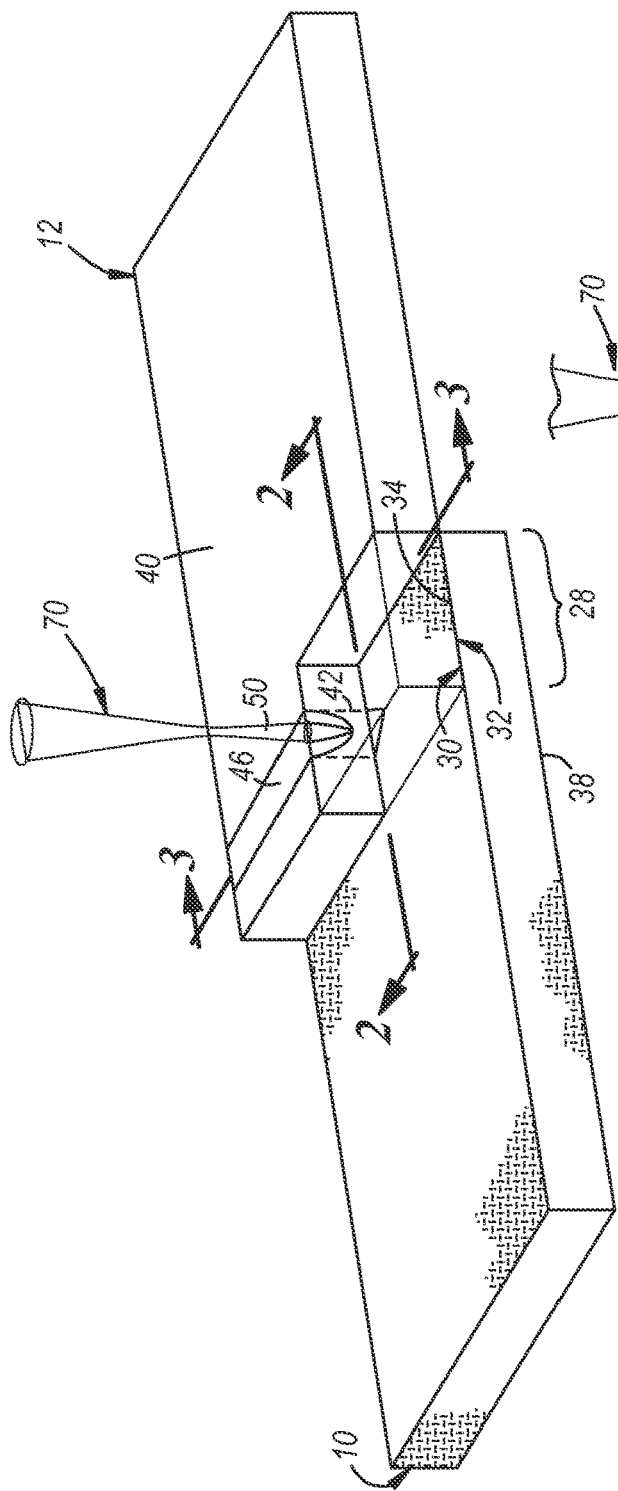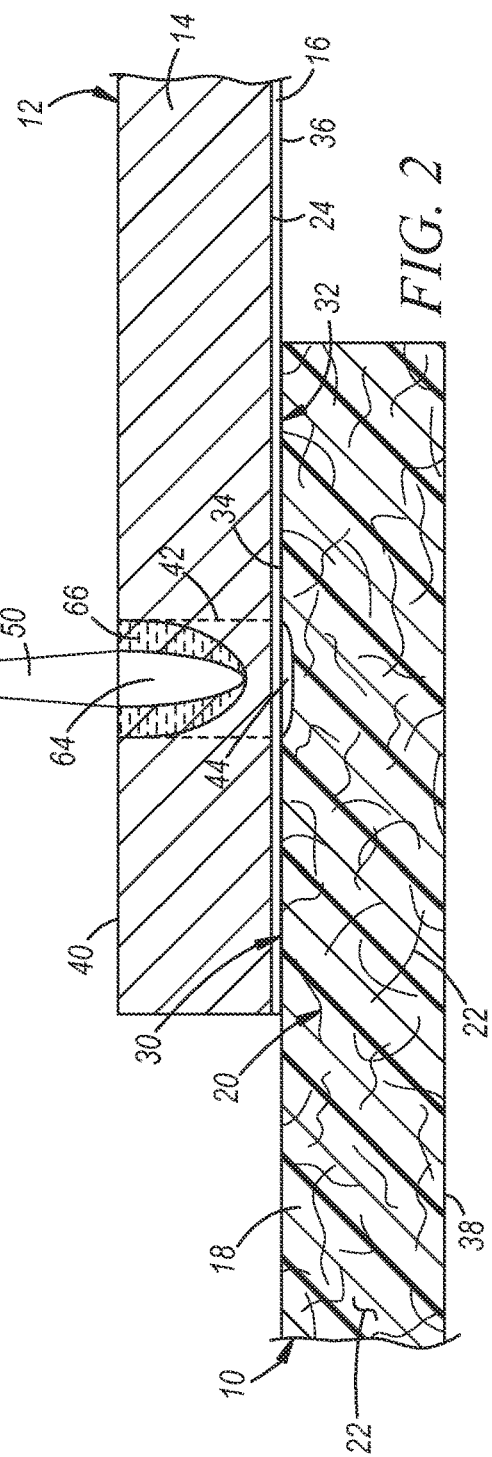
FIG. 1
FIG. 2

JOINING OF THERMOPLASTIC TO METAL WITH ENHANCED INTERFACIAL CHEMICAL BONDING

TECHNICAL FIELD

The technical field of this disclosure relates generally to a method of joining a thermoplastic composite workpiece and a metal workpiece.

BACKGROUND

A thermoplastic is a melt-processable polymeric material that, unlike a thermoset polymer, cannot be irreversibly cured through chemical crosslinking. A thermoplastic composite combines a thermoplastic polymer matrix with an embedded reinforcement phase such as a continuous filament or fibers. One notable example of a thermoplastic composite is a carbon-fiber-reinforced-polymer, or CFRP for short, which includes a thermoplastic polymer matrix reinforced with carbon fibers. A wide range of other thermoplastic composites are of course known in the art. Thermoplastic-based materials (e.g., thermoplastics or thermoplastic composites), in general, have some notable characteristics when compared to metals and thermoset materials, including their high strength-to-weight ratio, impact resistance, ability to withstand static and fatigue loads, potential for directional strength profiles, and the recyclable nature of the thermoplastic polymer matrix.

A number of industries—the automotive, aerospace, and marine industries in particular—have become interested in structural workpieces manufactured from thermoplastic-based materials as a possible substitute for metallic or thermoset-based workpieces. In the automotive industry, for example, vehicle body panels that include one or more thermoplastic-based workpieces are considered good candidates to achieve overall vehicle weight reduction and, in turn, improved fuel economy. When used in that way, a thermoplastic-based workpiece will typically have to be attached to a metal workpiece in a manufacturing setting during fabrication of the vehicle body panel. This presents a challenge as it can be difficult to attach thermoplastic-based workpieces to other types of workpieces, most notably metallic workpieces, by conventional techniques employed in a manufacturing setting at a reasonable cost.

Past attempts to try and attach a thermoplastic-based workpiece to a metal workpiece have yielded mixed results. Traditional fusing welding techniques—e.g., ultrasonic welding, resistance spot welding, etc.—typically require double-side access and are unable to obtain more than a weak joint due to the sharp difference in physical properties of the two workpieces. And while a particular laser welding technique known as laser-assisted metal and plastic joining (LAMP) has shown better results, conventional practices of the technique derive its joint strength primarily through mechanical interlock, which may not be suitable for all end-use applications. Still further, adhesive bonding is minimally effective since thermoplastic-based workpieces generally have low surface energy, often necessitating high-cost surface treatments like corona discharge or plasma treatments to be effective. Even the use of mechanical fasteners is challenging since they tend to concentrate stress in the workpiece and damage the reinforcing phase that may be present.

The current practice of attaching a thermoplastic-based workpiece to a metal workpiece employed by commercial manufactures involves the combined use of self-piercing rivets (SPR) and adhesive bonding. While this has yielded acceptable results in some instances, the overall process is complex, expensive, and time-consuming in a manufacturing setting. The combined use of adhesive bonding and self-piercing rivets also implicates the issues mentioned above; that is, the need to conduct surface treatments to improve the surface energy of the thermoplastic-based workpiece, the creation of stress concentrations around the self-piercing rivets, and the infliction of damage to the reinforcing phase if the thermoplastic-based workpiece is a thermoplastic composite workpiece. Self-piercing rivets, moreover, require double-sided access in order to complete the riveting process. In light of these challenges currently facing a number of manufacturing industries, there is an apparent need for a simpler and more effective way to attach a thermoplastic-based workpiece to a metal workpiece.

SUMMARY

A method of attaching a thermoplastic-based workpiece and a metal workpiece that are assembled in overlapping fashion is disclosed. The method involves providing a workpiece stack-up in which faying surfaces of the thermoplastic-based workpiece and the metal workpiece overlap to establish a faying interface. The thermoplastic-based workpiece includes a thermoplastic polymer matrix, which includes metal-reactive carbonyl moieties, and an optional reinforcing phase embedded within the polymer matrix. The metal workpiece includes a base metal substrate and a metal reaction coating that is applied over a surface of the base metal substrate. The metal reaction coating is applied over all or part of the base metal substrate so that it constitutes and provides at least the faying surface of the metal workpiece that confronts and contacts the faying surface of the thermoplastic-based workpiece when the workpieces are assembled.

The metal reaction coating is composed of a metal that, when heated, reacts chemically with the metal-reactive carbonyl moieties of the thermoplastic polymer matrix to attach the metal workpiece to the thermplastic-based workpiece through interfacial chemical bonding. For example, the metal reaction coating may be composed of chromium, nickel, titanium, aluminum, zinc, boron, manganese, silicon, or a combination of any of those materials. The metal chosen to constitute the metal reaction coating can be deposited onto the surface of the base metal substrate by any suitable technique including, but not limited to, electroplating, magnetron sputtering, thermal evaporation, plasma-enhanced chemical vapor deposition (PECVD), low-pressure chemical vapor deposition (LPCVD), and hot-dip coating, to name but a few. And while the thickness of the metal reaction coating can vary depending on several factors, it typically has a thickness that ranges from 1 μm to 60 μm.

To promote interfacial chemical bonding at the faying interface and secure attachment of the workpieces, an energy source is directed towards and impinges an outer surface of the metal workpiece. The energy source may be a laser beam, an electrical arc, or some other suitable source of energy, and it may be directed at one or more individual spot locations and/or moved along the metal workpiece in a weld pattern. When operating, the energy source generates a concentrated zone of heat within the metal workpiece and around the energy source that heats the metal reaction coating and melts a skin layer of the faying surface of the thermoplastic-based workpiece. The melted thermoplastic is believed to react with the heated metal reaction coating at this time. Specifically, the metal-reactive carbonyl moieties are thought to react with the metal reaction coating to establish chemical bonds that remain intact after the metal reaction coating cools and the melted thermoplastic re-solidifies.

BRIEF DESCRIPTION OF THE DRAWINGS

FIG. 1 is an elevated perspective view of a thermoplastic-based workpiece and a metal workpiece assembled in overlapping fashion, and an energy source being directed towards and impinging an outer surface of the metal workpiece so as to attach the workpieces at their faying interface;

FIG. 2 is a magnified cross-sectional view of the overlapping workpieces depicted in FIG. 1 as well as the energy source being directed towards and impinging the outer surface of metal workpiece and the resultant concentrated zone of heat that is generated within the metal workpice;

DETAILED DESCRIPTION

Figure 3:
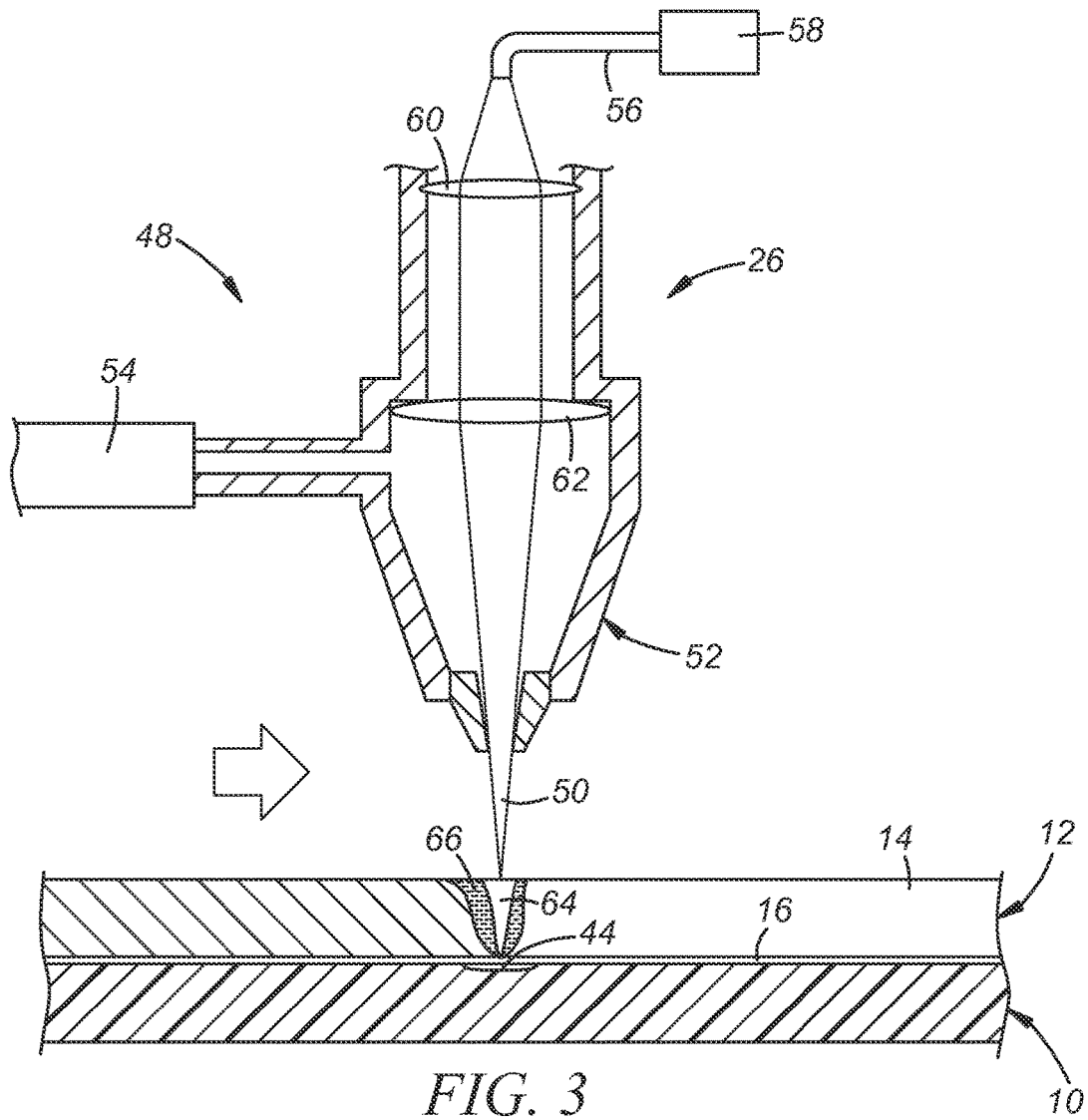
FIG. 3 is a cross-sectional view, taken along lines 3-3, of the overlapping workpieces depicted in FIG. 1 as well as the energy source being directed towards and impinging the outer surface of metal workpiece.
Figure 4A:
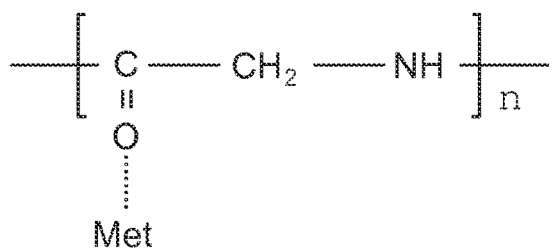
FIG. 4A schematically depicts the interfacial chemical bonding between polyamide (PA) and a metal reaction coating according to one embodiment of the disclosed method.
Figure 4B:
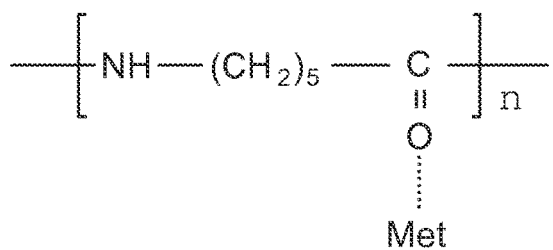
FIG. 4B schematically depicts the interfacial chemical bonding between nylon-6 (PA6) and a metal reaction coating according to one embodiment of the disclosed method.
Figure 4C:
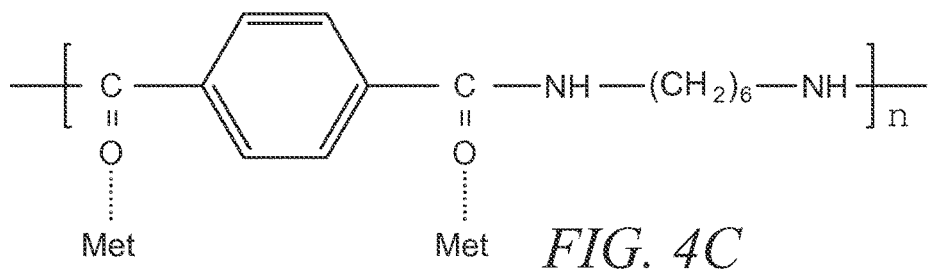
FIG. 4C schematically depicts the interfacial chemical boding between polyphthalamide PA6/T and a metal reaction coating according to one embodiment of the disclosed method.
Figure 4D:
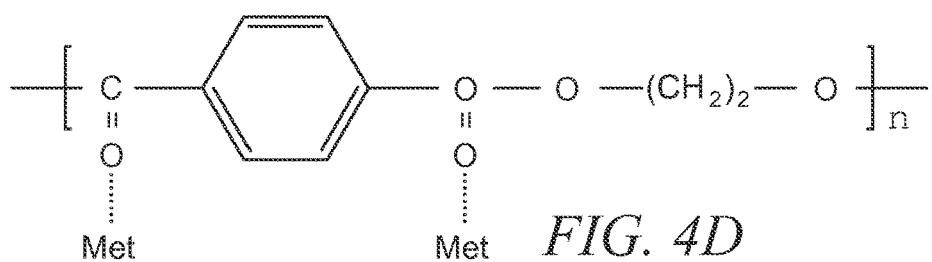
FIG. 4D schematically depicts the interfacial chemical bonding between polyethylene terephthalate (PET) and a metal reaction coating according to one embodiment of the disclosed method.
Figure 4E:
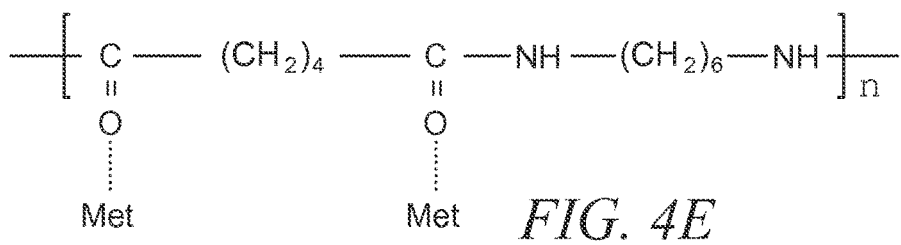
FIG. 4E schematically depicts the interfacial chemical bonding between nylon-6,6 (PA6,6) and a metal reaction coating according to one embodiment of the disclosed method.

A method of attaching a thermoplastic-based workpiece 10 to a metal workpiece 12 is depicted generally in FIGS. 1-3. The metal workpiece 12 includes a base metal substrate 14 and a metal reaction coating 16 applied to at least the surface of the metal substrate 14 that faces the thermoplastic-based workpiece 10 during attachment of the workpieces 10, 12. The metal reaction coating 16 bonds chemically with the thermoplastic-based workpiece 10 when heated. Such interfacial chemical bonding can provide the attachment between the two workpieces 10, 12 with a shear strength that is greater than the shear strength obtainable through adhesive bonding, resistance spot welding, ultrasonic welding, and a host of other attachment techniques. Additionally, the disclosed method is comparatively easy to practice as it requires only single-side access to the metal workpiece 12 and does not necessarily rely on expensive and laborious surface treatments being conducted on the thermoplastic-based workpiece 10 or the use of stress-concentrating and fiber-damaging mechanical fasteners, although such practices can certainly be employed if desired for whatever reason.

The thermoplastic-based workpiece 10 includes a thermoplastic polymer matrix 18. The thermoplastic polymer matrix 18 may be comprised of a thermoplastic polymer having recurring metal-reactive carbonyl moieties (—C=O). Carbonyl moieties can be found within the polymer backbone as part of repeating units that include one or more (a) ketone functional groups, (b) ester functional groups, (c) amide functional groups, or (d) sulfoxide functional groups. The chemical formula of each of the above-recited functional groups that contain a carbonyl moiety is depicted below:

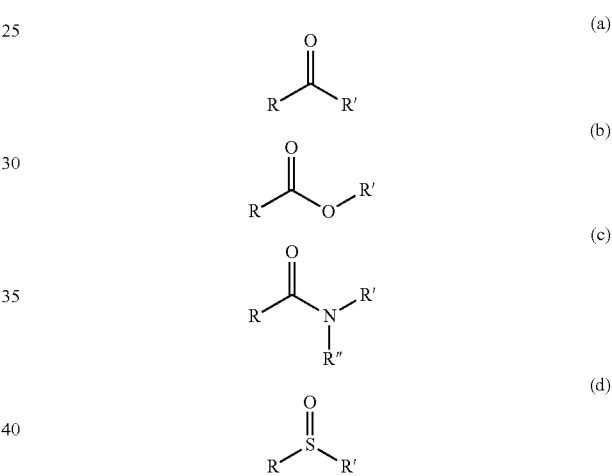

Some examples of thermoplastic polymers having metal-reactive carbonyl moieties include an aliphatic polyamide such as PA, PA6 (Nylon-6), PA6,6 (Nylon-6,6), a polyphthalamide such as the polycondensation reaction of hexamethylenediamine and terephthalate acid (PA6/T), a polyester such as polyethylene terephthalate (PET), a polycarbonate (PC) such as the reaction product of bisphenol A and phosgene, a polyacrylate such as poly methyl methacrylate (PMMA), and a polyurethane (TPU) including polyether- and polyester-based TPU's. PA, PA6, PA6,6, PA6/T, and PET are the most preferred thermoplastic polymers used as the thermoplastic polymer matrix 16, and each of their chemical formulas is provided below.

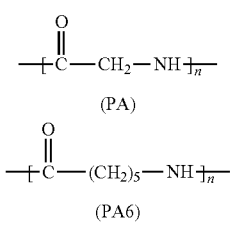

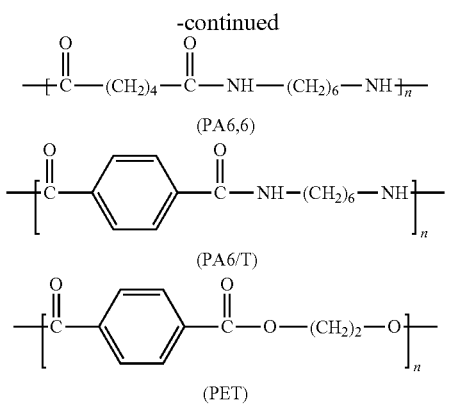

(PA6,6)

(PA6/T)

(PET)

The thermoplastic-based workpiece 10, as shown here in FIG. 2 is preferably a thermoplastic composite workpiece. A thermoplastic composite workpiece includes a reinforcing phase 20 embedded within the thermoplastic polymer matrix 18. The reinforcing phase 20 may comprise, for example, one or more reinforcing fibers 22. The reinforcing fibers 22 embedded within the thermoplastic polymer matrix 18 may be one or more of fiberglass fibers, glass fibers, carbon fibers, aramid fibers such as Kevlar® fibers, or ultra-high-molecular-weight polyethylene fibers. The inclusion of the reinforcing phase 20 within the thermoplastic polymer matrix 18 alters the physical properties of the workpiece 10. Some of the physical properties that can be affected include tensile strength, compression strength, elasticity, heat resistance, and deformation resistance, among others.

The base metal substrate 14 of the metal workpiece 12 is preferably composed of steel. Many different kinds of steel may be employed including mild (low carbon) steel, interstitial-free (IF) steel, a high-strength low-alloy (HSLA) steel, or an advanced high strength steel (AHSS) such as dual phase (DP) steel, transformation-induced plasticity (TRIP) steel, twinning-induced plasticity (TWIP) steel, complex-phase (CP) steel, martensitic (MART) steel, hot-formed (HF) steel, and press-hardened (PHS) steel. The type of steel chosen may have a minimal ultimate tensile strength that spans a fairly wide range. For instance, the steel may have an ultimate tensile strength that ranges anywhere from 200 MPa to 1800 MPa, although tensile strengths outside of this range are certainly possible. The flexibility to use any of an extensive variety of steels in the metal workpiece 12—including many AHSS steels—is notable since the self-piercing rivets as used in current manufacturing attachment practices have trouble penetrating steels with an ultimate tensile strength of 600 MPa and greater. The use of self-piercing rivets is thus more limited in application than the disclosed method.

To facilitate attachment of the thermoplastic-based workpiece 10 and the metal workpiece 12, as will be further explained below, the metal reaction coating 16 is applied over at least a surface 24 of the base metal substrate 14 that will face the thermoplastic-based workpiece 10 during a heat-induced attachment process. The metal reaction coating 16 is composed of a metal that, when heated, reacts chemically with the metal-reactive carbonyl moieties of the thermoplastic polymer matrix 18 to attach the metal workpiece 12 to the thermoplastic-based workpiece 10. Suitable candidates for making the metal reaction coating 16 include chromium, nickel, titanium, aluminum, zinc, boron, manganese, silicon, and combinations of any of those materials. Without being bound by theory, it is believed that of the partial negative charge (δ) on the oxygen end of the moderately polar carbonyl moieties which results from differences in electronegativities of the carbon and oxygen atoms—enables nucleophilic attack on the types of metals that may constitute the metal reaction coating 16, thus resulting in organometal bonds of the Met-O—C kind (see FIGS. 4A-4E). Of the metals listed above, chromium is preferred due to its relatively strong corrosion and wear resistance.

Referring now specifically to FIGS. 1-3, the thermoplastic-based workpiece 10 and the metal workpiece 12 can be attached together—with the help of the metal reaction coating 16—by a heating apparatus 26. The size, shape, and thickness of the thermoplastic-based workpiece 10 and the metal workpiece 12 may vary depending on several factors including the specifications of the part being formed. In the automotive industry, however, the thermoplastic-based workpiece 10 and the metal workpiece 12 have thicknesses that may typically range anywhere from 1 mm to 10 mm. And, more specifically within the metal workpiece 12, the base metal substrate preferably has a thickness that ranges from 0.3 mm to 6 mm while the metal reaction coating 16 applied to the metal substrate 14 typically has a thicknesses that ranges from about 1 μm to 60 μm.

To attach the two workpieces 10, 12 with the heating apparatus 26, the thermoplastic-based workpiece 10 and the metal workpiece 12 are first assembled in overlapping fashion to provide a workpiece stack-up 28. When assembled in this way, a faying surface 30 of the thermoplastic-based workpiece 10 and a faying surface 32 of the metal workpiece 12 overlap and make contact along a faying interface 34 that encompasses an intended attachment site. Here, as shown, an exposed exterior surface 36 of the metal reaction coating 16 denotes the faying surface 32 of the metal workpiece 12. Each of the thermoplastic-based workpiece 10 and the metal workpiece 12 also includes an outer surface 38, 40 that faces in the opposite direction of its faying surface 30, 32. Assembling the two workpieces 10, 12 in overlapping fashion and then attaching them at the faying interface 34 is a common practice in the automotive industry during the manufacture of vehicle component parts such as doors, roofs, hoods, and decklids.

At some point prior to assembling the workpiece stack-up 28, the metal reaction coating 16 is applied to the surface 24 of the base metal substrate 14. The metal chosen to constitute the metal reaction coating 16 can be deposited onto the surface 24 of the base metal substrate 14 by any suitable technique including, but not limited to, electroplating, magnetron sputtering, thermal evaporation, plasma-enhanced chemical vapor deposition, low-pressure chemical vapor deposition, and hot-dip coating, to name but a few. In a preferred embodiment, chromium is electroplated onto the base metal substrate 14 from an acidic chromate or dichromate solution to fabricate the metal reaction coating 16. The application of the metal reaction coating 16 to the base metal substrate 14 can be performed by the steel manufacturer (e.g., galvanized AHSS or aluminum-coated hot stamped steel) or the vehicle manufacturer, or somewhere in between by another entity, whichever is desired.

After the workpiece stack-up 28 is assembled, the heating apparatus 26 directs an energy source 70 towards the outer surface 40 of the metal workpiece 12 at the attachment site. This targeted energy source 70 impinges the outer surface 40 of the metal workpiece 12 and is absorbed to generate a concentrated zone 42 of heat within the metal workpiece 12 that extends down to the faying interface 34. The generated heat melts the metal workpiece 12 and warms up—and may even melt—the metal reaction layer 16 while melting an adjacent skin layer 44 of thermoplastic at the underlying portion of the faying surface 30 of the thermoplastic-based workpiece 10. The melted thermoplastic, in turn, reacts with the heated metal reaction layer 16 to effectuate interfacial chemical bonding at the faying interface 34 that continues to exist after the metal reaction layer 16 cools and the adjacent melted skin layer of thermoplastic cools and solidifies. Depending on the type of attachment specified, the targeted energy source 70 may be directed and kept at a spot location on the outer surface 40 of the metal workpiece 12 or, as shown, it may be directed at a starting point and then moved along a weld path 46 that can follow a wide range of linear or non-linear patterns.

The energy source 70 employed to effectuate attachment of the workpieces 10, 12 may be a laser beam or an electrical arc. As such, in various embodiments, the heating apparatus 26 may be a remote laser welding apparatus, a conventional laser welding apparatus, or an arc welding apparatus (TIG, MIG, etc.). In a preferred embodiment, as shown best in FIG. 3, the heating apparatus 26 is a conventional laser welding apparatus 48 that directs a laser beam 50 at the metal workpiece 12. The conventional laser welding apparatus 48 includes a laser optic head 52 and a robot arm 54 that supports and carries the laser optic head 52. A laser delivery cable 56—preferably a fiber optic cable—is coupled to the laser optic head 52 and transmits the laser beam 50 to the head 52 from a laser beam generator 58. The laser beam generator 58 includes components, such as a laser resonator and gain medium, which produce the laser beam 50. Any suitable type of laser may be employed as the laser beam 50. Some examples include near-infrared lasers, including solid-state lasers such as a neodynium-doped yttrium aluminum garnet (Nd:YAG) laser and fiber lasers such as a ytterbium-dope fiber laser.

The laser optic head 52 focuses the laser beam 50 and directs it towards the outer surface 40 of the metal workpiece 12. A shielding gas may also be directed at the metal workpiece 12 to produce an inert environment in the space around the laser beam 50, if desired. The laser optic head 52 may include a collimating lens 60 and a focusing lens 62. The collimating lens 60 reduces the cross-sectional divergence of the laser beam 50 such that the radius of the laser beam 50 does not change significantly along its length or propagation distance (i.e., the collimated laser beam is generally comprised of parallel light rays). The focusing lens 62, in turn, focuses the laser beam 50 to a focal point that may lie at the outer surface 40 of the metal workpiece 12, or some distance above or below the outer surface 40, depending on the amount of penetration intended. Upon impinging the outer surface 40 of the metal workpiece 12, the energy of the laser beam 50 is absorbed by the metal workpiece 12 to create the concentrated zone 42 of heat. A keyhole 64, which is a column of vapor and plasma derived from the metal workpiece 12, may be formed within the concentrated zone 42 of heat along with a surrounding pool of molten metal 66, but does not necessarily have to be if enough heat can be conducted to the faying interface 34 in the absence of a keyhole 64 and through heat conduction alone.

The concentrated zone 42 of heat warms up and may even melt the metal reaction layer 16 while melting the skin layer 44 of the faying surface 30 of the thermoplastic-based workpiece 10 as explained above. The chemical reaction between the melted skin layer 44 of the thermoplastic-based workpiece 10 and the metal reaction layer 16 proceeds until the concentrated zone 42 of heat subsides, leaving behind interfacial Met-O—C chemical bonds (see FIGS. 4A-4E) between the carbonyl moieties of the thermoplastic-based workpiece 10 and the metal reaction layer 16. The concentrated zone 42 of heat subsides when the laser beam 50 is stopped or when the laser beam 50 is moved to a new location. Indeed, in some instances, the robot arm 54 may be connected to a base and is constructed with rotary, swivel, hinge, and/or other types of junctions that permit the arm 54 to move the laser optic head 52 along the weld path 46 in a controlled manner to produce an extended seam of chemical bonding at the faying interface 34.

The interfacial chemical bonding that is developed at the faying interface 34 provides an attachment that is stronger in shear strength than what can normally be achieved through adhesive bonding, two-sided fusion welding techniques such as spot welding and ultrasonic welding, and the mechanical interlock attributed to LAMP welding. Shear strengths of greater than 20 MPa, and even greater than 25 MPa, are not uncommon with the disclosed method. Moreover, apart from its ability to produce repeatable attachments with quality shear strength properties, the disclosed method is also simpler, faster, and less-damaging than using self-piercing rivets and other mechanical fasteners. The disclosed method is thus capable of performing better on a consistent basis than current conventional attachment techniques and can be readily integrated into, and practiced within, a manufacturing setting.

Example

In this Example, carbon-reinforced nylon-6 workpieces were attached to chromium electroplated mild steel workpieces using a conventional laser apparatus with a 700 W laser beam to demonstrate the effects of the disclosed method. The results compared favorably to a carbon-reinforced nylon-6 workpiece that was attached to an uncoated mild steel workpiece by conventional laser welding as well as to a carbon-reinforced nylon-6 workpiece that was attached to an uncoated mild steel workpiece by adhesive bonding. In fact, as will be further discussed below, the use of a chromium reaction coating resulted in improved shear strength, which can be affected by the scanning speed of the laser beam, and also caused the workpieces to fracture within the carbon-reinforced nylon-6 workpiece (as opposed to at the interface of the workpieces) when the workpieces were forcibly pulled apart.

Figure 5:
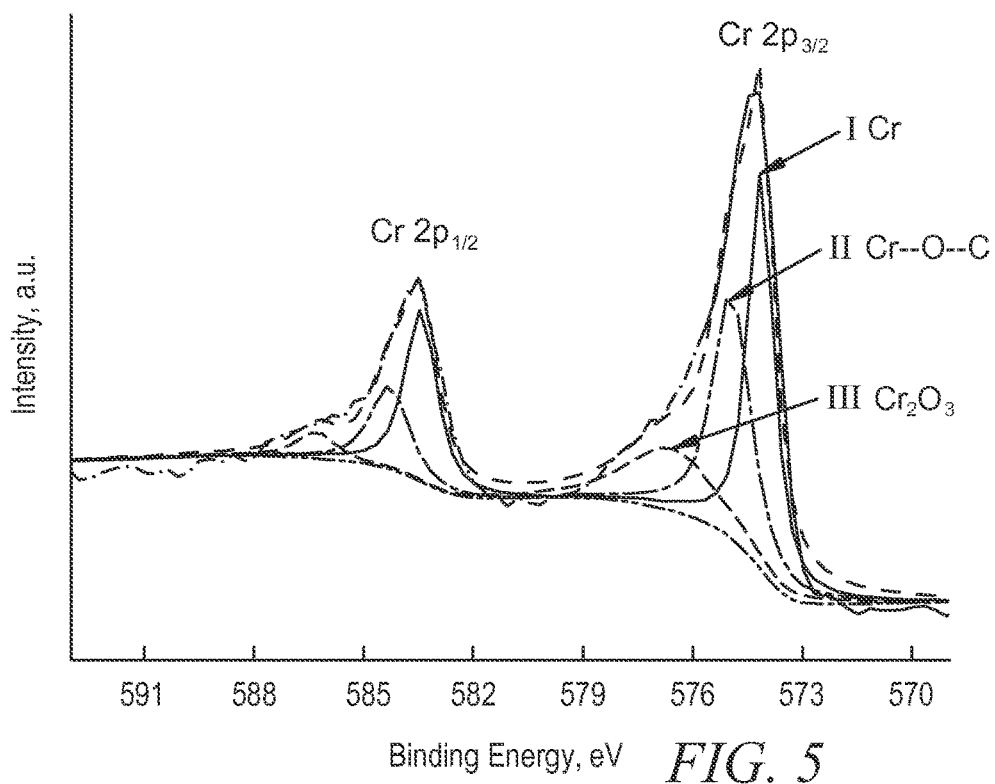
FIG. 5 is a XPS output spectrum showing the surface chemistry of the attachment between the workpieces at the faying interface.

After one of the carbon-reinforced nylon-6 workpieces was attached to a chromium electroplated mild steel workpiece, the bonded faying interface was analyzed by XPS (x-ray photoelectron spectroscopy) to determine the surface chemistry of the attachment at the faying interface. As depicted in the XPS output spectrum, which is shown in FIG. 5, the presence of chemical Cr—O—C bonds (II) was indicated, lending support to the belief that the attachment between the workpieces is supported with interfacial chemical bonding and not just by mere mechanical interlock. The strength attributed to such interfacial chemical bonding was then evaluated through shear strength testing as well as through visual inspection of the workpieces when fractured.

Figure 6:
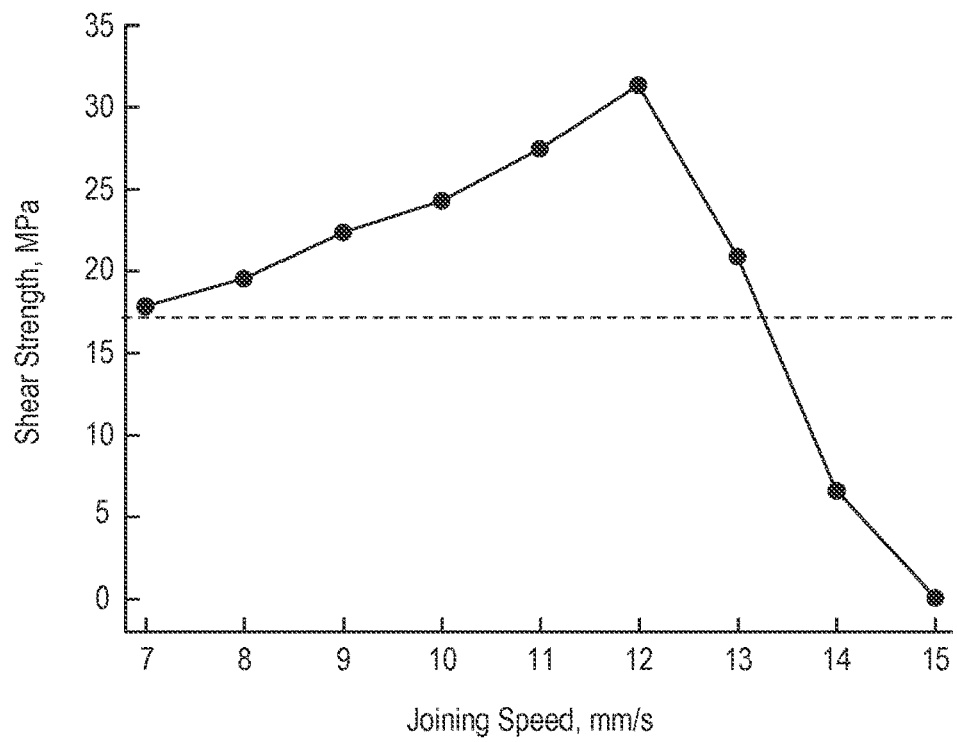
FIG. 6 is a graph showing the shear strength of an attachment between a thermoplastic-based workpiece and a metal workpiece, as obtained by the disclosed method, compared to the shear strength of an attachment between a thermoplastic-based workpiece and a metal workpiece in which the disclosed method was not practiced.

For comparative purposes, a carbon-reinforced nylon-6 workpiece was attached to a mild steel workpiece by an adhesive. The adhesive used was a Scotch-Weld™ thermosetting modified epoxy adhesive obtained from The 3M Company (St. Paul, Minn.) under the product designation AF-3109-2K. The adhesively bonded workpieces were then subjected to shear strength testing in which opposed parallel forces were applied the workpieces until rupture. The shear strength of the adhesive bond was found to be about 17 MPa, which is identified by the horizontal broken line in FIG. 6. When the disclosed method is used, however, the attachment between the carbon-reinforced nylon-6 workpiece and the chromium electroplated mild steel workpiece was defined by a shear strength that exceeded 17 MPa in many instances. For example, as shown in FIG. 6, the disclosed method achieved a shear strength as high as 31.3 MPa, which occurred when the conventional laser welding process was performed at a scanning speed of 12 mm/s.

Figure 7:
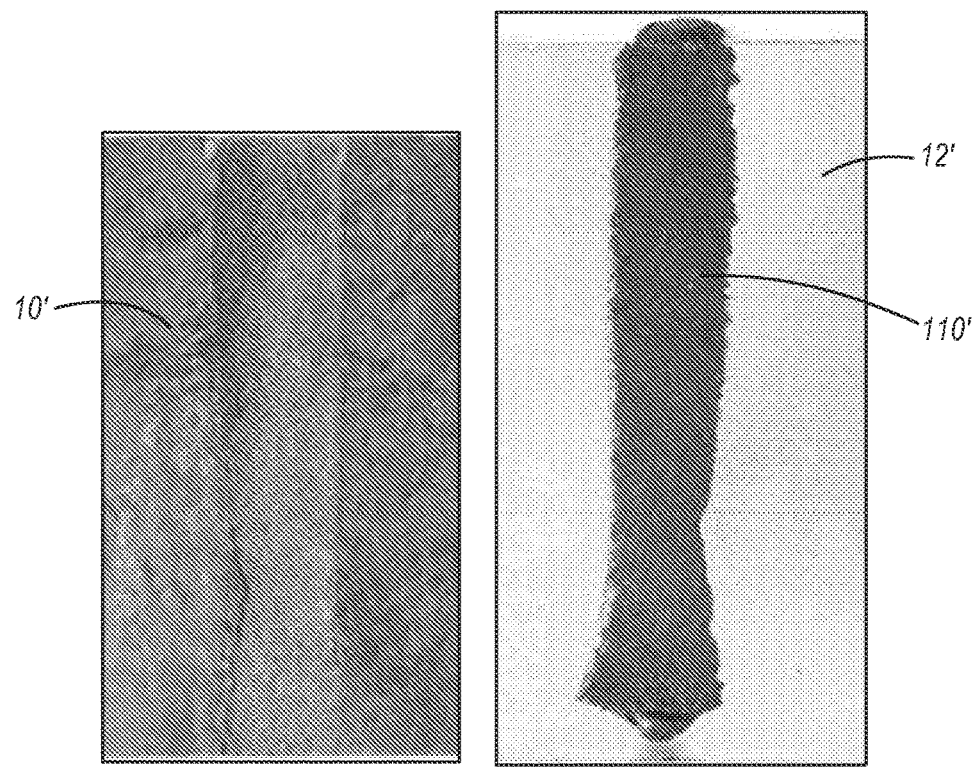
FIG. 7 is a photograph showing that, upon forcible separation, the attachment at the faying interface of the workpieces did not fail but instead tore out a portion of the thermoplastic-based workpiece.

Fracture testing also indicated that the disclosed method contributed to a stronger attachment. In particular, as shown in FIG. 7, a carbon-reinforced nylon-6 workpiece and a chromium electroplated mild steel workpiece were attached by conventional laser welding according to the disclosed method and then forcibly pulled apart. Pulling the workpieces apart and inspecting workpieces helps gauge the strength of the attachment. If the attachment fails at the interface of the workpieces, then the attachment itself is the source of the failure. If, however, the attachment holds and one workpiece tears out a portion of the other workpiece, then the attachment is considered to be strong and robust since one of the workpieces essentially failed structurally before the attachment did. Here, when the carbon-reinforced nylon-6 workpiece 10' and the chromium electroplated mild steel workpiece 12' were pulled apart, the steel workpiece 12' tore out a portion 110' of the carbon-reinforced nylon-6 workpiece 10'. This meant that the attachment was strong and held firm throughout the test while the carbon-reinforced nylon-6 workpiece fractured internally.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of attaching a thermoplastic-based workpiece and a metal workpiece, the method comprising:

providing a workpiece stack-up that includes a thermoplastic-based workpiece and a metal workpiece assembled in overlapping fashion, the thermoplastic-based workpiece having a faying surface that overlaps and contacts a faying surface of the metal workpiece along a faying interface of the workpieces, the thermoplastic-based workpiece comprising a thermoplastic polymer matrix that includes metal-reactive carbonyl moieties, and the metal workpiece comprising a base metal substrate and a metal reaction coating applied over the base metal substrate, the metal reaction coating providing the faying surface of the metal workpiece and contacting the faying surface of the thermoplastic-based workpiece;

directing an energy source at an outer surface of the metal workpiece, the energy source impinging the outer surface of the metal workpiece and creating a concentrated zone of heat that melts the metal workpiece to thereby form a pool of molten metal and further melts a portion of the faying surface of the thermoplastic-based workpiece while at least warming up the metal reaction coating, the metal reaction coating reacting with the portion of the faying surface of the thermoplastic-based workpiece that is melted to establish interfacial chemical bonding at the faying interface of the workpieces; and allowing the metal reaction coating to cool and the portion of the faying surface of the thermoplastic-based workpiece melted by the energy source to cool and re-solidify, the interfacial chemical bonding established at the faying interface remaining after the metal reaction coating has cooled and the portion of the faying surface of the thermoplastic-based workpiece has re-solidified.

2. The method set forth in claim 1, wherein the metal reaction coating is selected from the group consisting of chromium, nickel, titanium, aluminum, zinc, boron, manganese, silicon, and combinations thereof.

3. The method set forth in claim 2, wherein the metal reaction coating is chromium.

4. The method set forth in claim 3, wherein the base metal substrate is steel, and wherein the chromium coating is electroplated onto the steel substrate prior to assembly of the workpiece stack-up.

5. The method set forth in claim 1, wherein the thermoplastic polymer matrix is an aliphatic polyamide, a polyphthalamide, a polyester, a polycarbonate, a polyacrylate, or a polyurethane.

6. The method set forth in claim 5, wherein the thermoplastic polymer matrix is PA6, PA6,6, PA6/T, PET, or PMMA.

7. The method set forth in claim 1, wherein the thermoplastic-based workpiece is a thermoplastic composite workpiece that comprises a reinforcement phase embedded in the thermoplastic polymer matrix.

8. The method set forth in claim 1, wherein the base metal substrate of the metal workpiece is steel.

9. The method set forth in claim 1, wherein the energy source is a laser beam.

10. A method of attaching a thermoplastic-based workpiece and a metal workpiece, the method comprising:

applying a metal reaction coating over a surface of a steel substrate to form a metal workpiece, the metal reaction coating being composed of chromium, nickel, titanium, aluminum, zinc, boron, manganese, silicon, or a combination of any of those materials;

assembling the metal workpiece in overlapping fashion with a thermoplastic-based workpiece such that a faying surface of the metal workpiece overlaps and contacts a faying surface of the thermoplastic-based workpiece along a faying interface, the thermoplastic-based workpiece comprising a thermoplastic polymer matrix that includes metal-reactive carbonyl moieties, and wherein an exposed surface of the metal reaction coating constitutes the faying surface of the metal workpiece;

directing an energy source against the metal workpiece to create a concentrated zone of heat that at least warms up the metal reaction coating at the faying interface and melts a portion of the faying surface of the thermoplastic-based workpiece in contact with the metal reaction coating; and allowing the metal reaction coating to cool and the portion of the faying surface of the thermoplastic-based workpiece melted by the energy source to cool and re-solidify such that the thermoplastic-based workpiece and the metal workpiece are attached at the faying interface through interfacial chemical bonding between the carbonyl moieties of the thermoplastic polymer matrix of the thermoplastic-based workpiece and the metal reaction coating.

11. The method set forth in claim 10, wherein the energy source is a laser beam.

12. The method set forth in claim 11, wherein directing the laser beam against the outer surface of the metal workpiece comprises:

providing a laser optic head that includes a focusing lens;
focusing a near-infrared laser beam with the focusing lens; and
directing the near-infrared laser beam towards the outer surface of the metal workpiece, the near-infrared laser beam impinging the outer surface and forming a keyhole within the metal workpiece.

13. The method set forth in claim 12, further comprising: moving the laser optic head to move the near-infrared laser beam along a predetermined weld path.

14. The method set forth in claim 10, wherein the thermoplastic polymer matrix includes repeating units that include one or more (a) ketone functional groups, (b) ester functional groups, (c) amide functional groups, or (d) sulfoxide functional groups.

15. The method set forth in claim 14, wherein the thermoplastic polymer matrix is an aliphatic polyamide, a polyphthalamide, a polyester, a polycarbonate, a polyacrylate, or a polyurethane.

16. The method set forth in claim 10, wherein the thermoplastic-based workpiece is a thermoplastic composite workpiece that comprises a reinforcement phase embedded in the thermoplastic polymer matrix.

17. The method set forth in claim 10, wherein the steel substrate is an advanced high strength steel having an ultimate tensile strength of 600 MPa or greater.

18. The method set forth in claim 10, wherein the metal reaction coating is composed of chromium, and wherein applying the chromium reaction coating comprises electroplating chromium over the surface of the steel substrate.

19. A method of attaching a thermoplastic-based workpiece and a metal workpiece, the method comprising:
applying a metal reaction coating over a surface of a mild steel substrate to form a metal workpiece, the metal reaction coating being composed of chromium;
assembling the metal workpiece in overlapping fashion with a thermoplastic composite workpiece such that a faying surface of the metal workpiece overlaps and contacts a faying surface of the thermoplastic composite workpiece along a faying interface, the thermoplastic composite workpiece comprising a polyamide polymer matrix and a carbon reinforcing phase embedded within the polyamide polymer matrix, and wherein an exposed surface of the metal reaction coating constitutes the faying surface of the metal workpiece; and
operating a laser optic head to direct a laser beam against the metal workpiece to create a concentrated zone of heat that extends to the faying interface and at least warms up the metal reaction coating at the faying interface and melts a portion of the faying surface of the thermoplastic composite workpiece in contact with the metal reaction coating, wherein, after the concentrated zone of heat subsides and the metal reaction coating has cooled and the portion of the faying surface of the thermoplastic composite workpiece has cooled and re-solidified, the thermoplastic composite workpiece and the metal workpiece are attached at the faying interface through interfacial chemical bonding having a shear strength of greater than 20 MPa.

* * * * *